United States Patent [19]
Arnold, James F.

[11] 3,713,204

[45] Jan. 30, 1973

[54] METHOD FOR CONNECTING TUBULAR MEMBERS

[75] Inventor: Arnold, James F., Shreveport, La.

[73] Assignee: Hydrocouple Corp., New Orleans, La.

[22] Filed: April 30, 1970

[21] Appl. No.: 33,494

Related U.S. Application Data

[63] Continuation of Ser. No. 709,678, March 1, 1968, abandoned, which is a continuation-in-part of Ser. No. 486,154, Sept. 9, 1965, Pat. No. 3,393,926.

[52] U.S. Cl. .................29/460, 285/18, 285/96, 285/101
[51] Int. Cl. .................B23p 3/00, B23p 19/04
[58] Field of Search........29/460, 446, 421, 401, 526, 29/428; 285/18, 148, 96, 101, 105, 111

[56] References Cited

UNITED STATES PATENTS

| | | | |
|---|---|---|---|
| 2,001,946 | 5/1935 | Tschappat | 285/148 |
| 2,313,169 | 3/1943 | Penick et al. | 285/96 X |
| 2,350,867 | 6/1944 | Bean et al. | 285/96 |
| 2,536,898 | 1/1951 | Works | 285/96 |
| 2,582,518 | 1/1952 | Works | 285/96 |
| 2,748,869 | 6/1956 | Hager | 285/96 |
| 3,097,866 | 6/1963 | Dversen | 285/18 |
| 3,142,500 | 7/1964 | Wesseler | 285/96 |
| 3,278,193 | 10/1966 | Groner et al. | 29/446 X |
| 2,922,664 | 1/1960 | Risley et al. | 285/96 |
| 2,226,304 | 12/1940 | Dillon | 285/111 X |

Primary Examiner—Charlie T. Moon
Attorney—Arnold, White & Durkee, Frank S. Vaden, III, Louis T. Pirkey and John F. Lynch

[57] ABSTRACT

A method is provided for joining together two lengths of pipe in an environment wherein conventional methods are not suitable, e.g., underwater. The method includes introduction of fluid under pressure from a remote source into a coupling member surrounding a pipe length to be joined, the fluid under pressure acting to effect the coupling to grip the pipe length and then become sealingly engaged therewith. In one embodiment, a method is provided wherein a hardenable material is used which is in the fluid state when introduced into the coupling, but which upon setting hardens into the solid state to form a relatively permanent connection.

2 Claims, 7 Drawing Figures

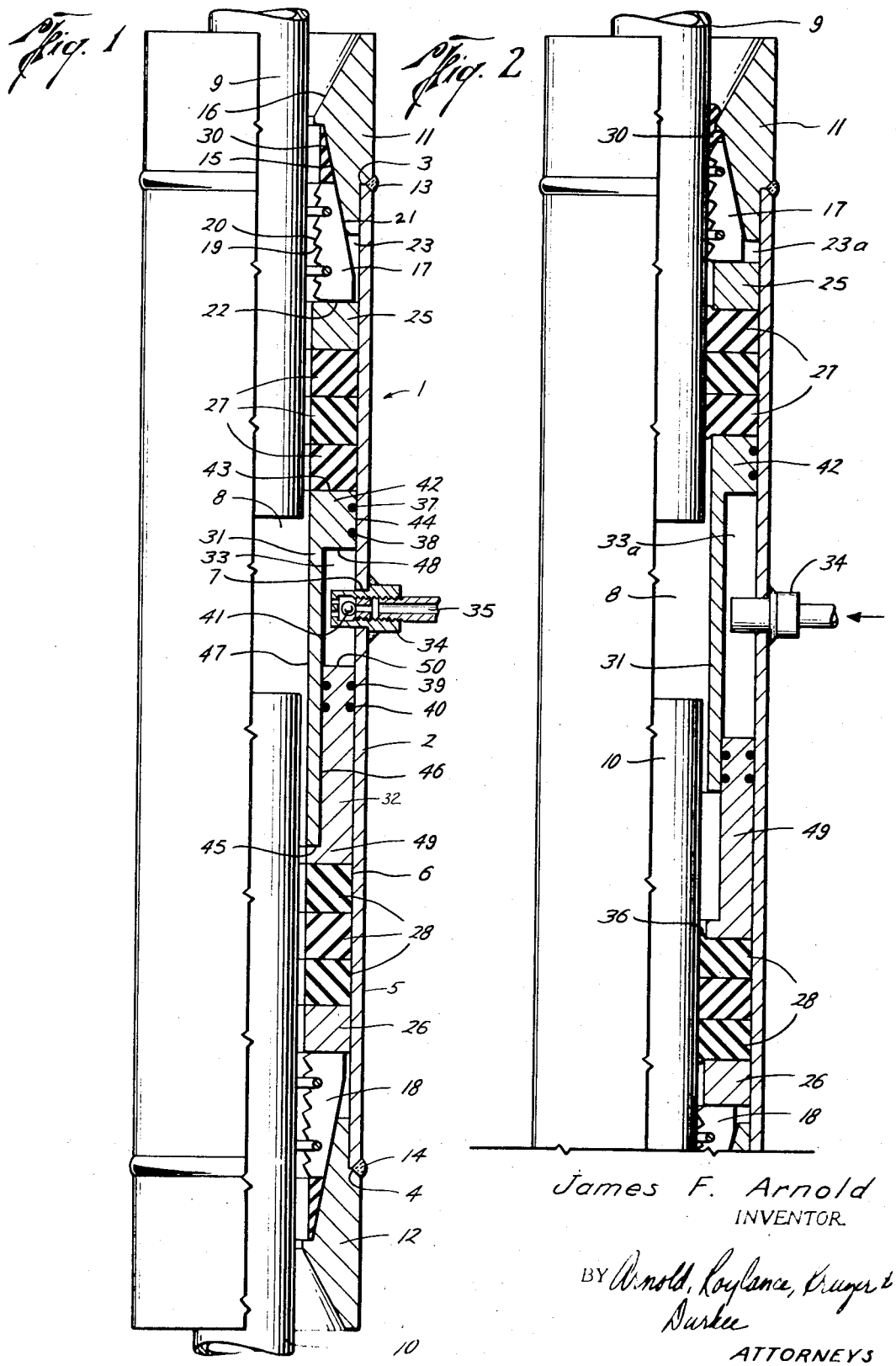

James F. Arnold
INVENTOR.

BY Arnold, Roylance, Kruger &
Durkee
ATTORNEYS

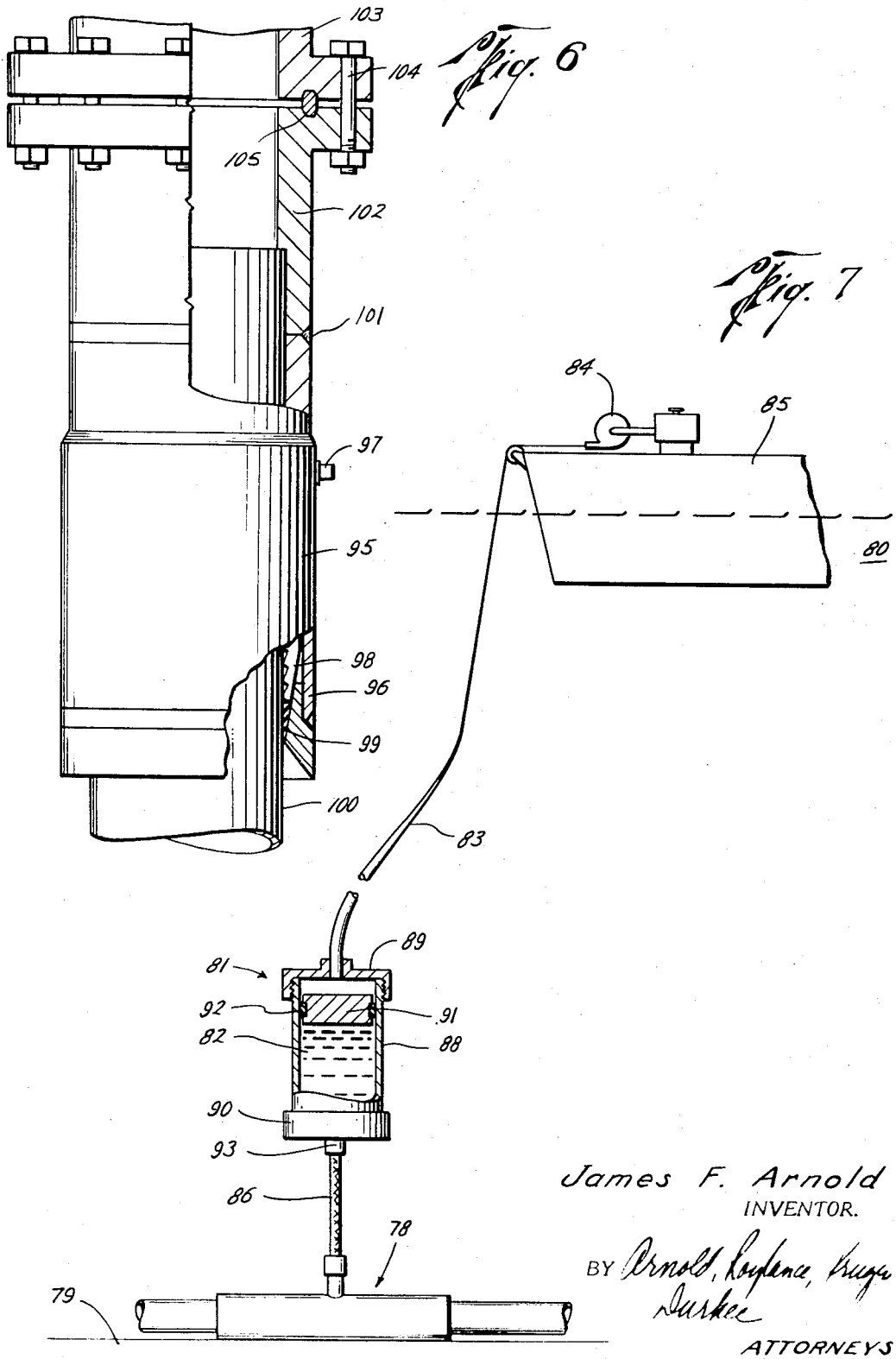

METHOD FOR CONNECTING TUBULAR MEMBERS

REFERENCE TO RELATED APPLICATIONS

This is a continuation of my copending application Ser. No. 709,678, filed Mar. 1, 1968, now abandoned, which is a continuation-in-part of my application Ser. No. 486,154, filed Sept. 9, 1965, now U.S. Pat. No. 3,393,926.

BACKGROUND AND SUMMARY OF THE INVENTION

This invention relates to a method for joining a length of pipe to another length of pipe or other tubular member, and for repairing a faulty section of pipe. This invention is especially useful in those environments in which conventional methods are not suitable, and requires no special preparation or pretreatment of the lengths of pipe to be joined.

Briefly, the invention comprises a method suitable for joining together lengths of pipe comprising affixing a coupling to the lengths of pipe to be joined, and introducing into said coupling a fluid under pressure in order to securely grip each of said lengths of pipe, whereby there is formed within said coupling an area in fluid communication with said lengths of pipe, and in fluid isolation with all areas exterior of said coupling.

Many problems are inherent in connecting together two or more conduits in certain working environments, for instance underwater or in areas where there exists the danger of explosion. With the rapid increase in the use of pipes and other conduits in these areas within recent years, this problem has become one of major concern among workmen and engineers.

This invention provides methods for solving this problem, and for ensuring the safe and easy joining of conduits in such problem areas without the necessity of costly or laborious pretreatment.

BRIEF DESCRIPTION OF THE DRAWINGS

In order that the manner in which the foregoing and other objects attained in accordance with this invention can be understood in detail, advantageous embodiments of the invention will be described with reference to the accompanying drawings, which form a part of this specification, and wherein:

FIG. 1 is an elevational view, partly in section, of a coupling useful in the methods of this invention, showing the coupling in position according to one embodiment of the invention, after two lengths of pipe to be joined have been inserted in the coupling, but before the coupling is actuated.

FIG. 2 is a view similar to FIG. 1, illustrating the coupling of FIG. 1 in its actuated position.

FIG. 6 is an elevational view, partly in section, of a means for adapting a well-head, in accordance with yet another embodiment of this invention.

FIG. 7 is a pictorial view illustrating a particularly preferred arrangement for introducing a pressurized fluid into another form of coupling useful in connection with this invention.

DETAILED DESCRIPTION OF PREFERRED EMBODIMENTS

Figure 3:
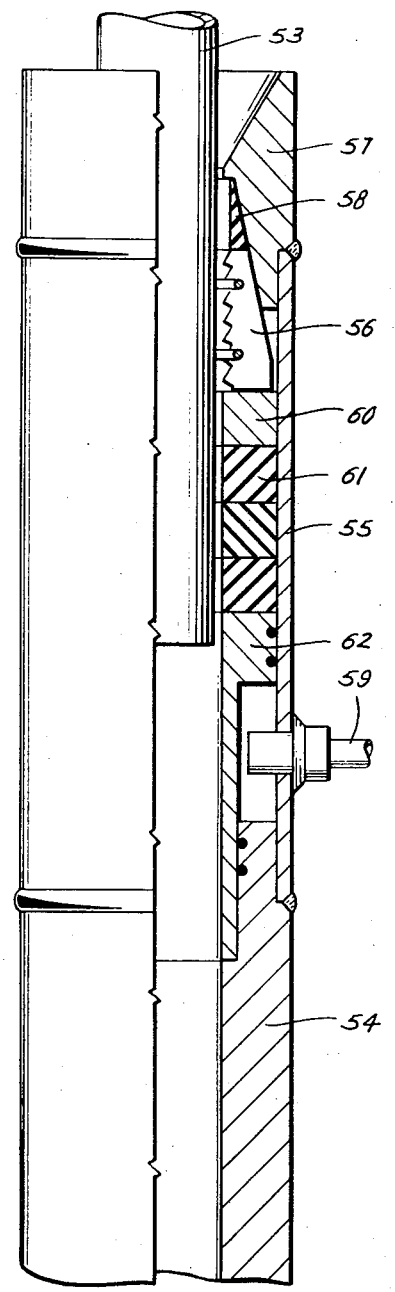
FIG. 3 is an elevational view, partly in section, of another form of coupling useful with the methods of this invention.

Referring now to the drawings in more detail, there is illustrated in FIGS. 1 and 2 a coupling 1 useful with the method of one advantageous embodiment of this invention. Coupling 1 includes an elongated tubular housing or casing 2 having ends 3 and 4, a cylindrical exterior surface 5, a generally smooth cylindrical internal surface 6, and an opening 7 therein near the transverse center thereof. The coupling 1 is thus seen to be in the form of a sleeve having a diameter which is suitable for fitting entirely around the lengths of pipe or other tubular members to be joined. It is not necessary for the diameter of the coupling to be constant, as seen in FIG. 5, and the coupling may be constructed of two sleeves meeting as in the form of the T-section of FIG. 4. Still, the couplings of the invention in all embodiments are generally tubular in configuration and therefore may be referred to herein as sleeves.

Means for securely engaging the two lengths of pipe 9 and 10 to be joined and for forming a permanent seal with these lengths of pipe are located inside the casing 2 and occupy an annular area the inside diameter of which is slightly greater than the outside diameter of the two lengths 9 and 10.

The above-mentioned means for engaging the pipe and forming a permanent seal have been desirably found to include (1) means for guiding the lengths of pipe into the coupling; (2) means for securely gripping the lengths of pipe; (3) means for effecting sealing engagement with the pipe lengths; and, (4) means for actuating said gripping and sealing means.

Guide means which are desirably provided on the coupling 1 for facilitating insertion of pipe lengths, conveniently take the form of members 11 and 12 located at each end of the coupling. In the FIG. 1 embodiment, such guide members are constructed as separate parts firmly secured to the ends 3 and 4 of casing 2 as by welds 13 and 14. It is understood, however, that guide members 11 and 12 could be constructed as integral parts of the casing 2, if desired. Guide members 11 and 12 of this embodiment include a conical-shaped inwardly tapering surface in a direction away from the transverse center of the coupling which provides a cam surface 15, and a conical-shaped outwardly tapering surface in a direction away from the transverse center of the coupling which provides a guide surface 16. Cam surface 15 serves to convert a portion of the longitudinal movement of the gripping means into radial movement when such means contact this surface, thus allowing the gripping means to firmly grip the lengths of pipe to be joined. Guide surface 16 serves to guide the lengths of pipe to be joined into the coupling. While it would not be absolutely necessary to provide both cam surface 15 and guide surface 16 in a single part, such an arrangement has been found to be particularly advantageous.

Gripping means are conveniently located axially inwardly of said guide means, and may desirably take the form of slips, segments of which are shown at 17 and 18. Such slips are movable axially within a certain distance inside the members 11 and 12 which serve as slip bowls. Any convenient number of slip segments may be included in each slip bowl, for example three. Such segments are desirably constructed of steel, and include at the inside diameter thereof radially inwardly facing teeth 19 and radially outwardly facing tapered surfaces 20, conical-shaped tapered surface 21 at the outer diameter thereof and generally flat end faces 22. The tapered surfaces 21 are adapted to contact the similarly shaped cam surfaces 15 of guide members 11 and 12 whereupon said slips are caused to move radially inwardly. As is readily seen from FIGS. 1 and 2, the slips are free for axial movement within the area 23, and 23a denotes the unoccupied area after the slips have been so moved by a longitudinal force transmitted by junk ring 25, which in this embodiment abuts the end faces 22 of slip segments 17. Junk rings 25 and 26 are desirably constructed, for example, of hard steel, and transmit axial force from engaging and sealing means, such as the side face of end packing ring 27, to the slips.

Means for securely engaging the pipe lengths to be joined and forming a seal therewith are conveniently located between the slips and the transverse center of the coupling, and conveniently take the form of packing rings 27, 28. Packing rings 27 and 28, which are no thicker than the interior dimensions of the coupling, must be resilient to some extent so that when placed under pressure they will deform to firmly press against the lengths of pipe 9 and 10 to be joined, as is clearly shown in FIG. 2. Any suitable material of construction may be used for rings 27, 28 as long as it is resilient and generally heat resistant. Hard rubber, asbestos, lead, and soft copper have been found to be useful. Although three packing rings 27, 28 are illustrated in FIGS. 1 and 2 at each end of the coupling, it is understood that any suitable number might be employed. Also, the packing rings may be of any suitable shape, for example V-shaped rings.

As a further sealing means against the length of pipe to be joined, it has been found advantageous to include in some embodiments a hard rubber insert 30 adjacent the slips on the side thereof away from the transverse center of the coupling. Under pressure, this insert will also be deformed to occupy the annular space between the guide and slip bowl 11, and the pipe 9, to thus form an effective seal therebetween.

Power operated means for actuating the engagement means and the gripping means may take various forms, but the embodiments shown in FIGS. 1-3 have been found particularly advantageous. Such means are illustrated in FIGS. 1 and 2 as a pair of members movable axially along the coupling apart from one another upon the application of pressure therebetween. Thus, such members may take the form of male piston 31 and female piston 32. Male piston 31 is desirably constructed as shown in FIGS. 1-3, wherein it is a generally tubular member having an elongate portion which includes a cylindrical external surface 46 and a cylindrical internal surface 47, and also having an enlarged end portion 42. End portion 42 includes a generally flat annular end face 43, an opposite annular face 48, and an outer cylindrical surface 44 which has a diameter substantially equal to the diameter of the inner wall 6 of casing 2, and which is sealingly engaged with the inner surface 6 of the casing 2 between annular faces 43 and 48. At the end of the male piston 31 opposite the generally flat annular face 43 is another generally flat annular end face 45. Female member 32 is desirably constructed as shown in FIGS. 1 and 2, wherein it is a generally tubular member which has an outer cylindrical surface of a diameter substantially equal to the diameter of the inner wall 6 of casing 2. It is mounted with the outer cylindrical surface in sealing engagement with the inner wall 6. An inner cylindrical surface is in sealing engagement with surface 46 of the elongate portion of male piston 31. In this embodiment, the piston 32 includes a radially inwardly projecting flange 49 at one end thereof, and a generally flat annular end face 50 at the opposite end thereof. Male piston 31 and female piston 32 are separated in the initial position by a space 33 which is in communication through inlet 34 in opening 7 with an inlet conduit 35. Space 33 is defined by annular face 48 and cylindrical surface 46 of male piston 31, end face 50 of female piston 32, and the inner wall 6 of casing 2. As is readily apparent from FIGS. 1 and 2, pistons 31 and 32 will, upon application of pressure (as by filling the area 33 between the pistons with a fluid under pressure), slide apart until the slips are no longer free to move. At this point, the pressurized fluid will occupy an increased area 33a as seen in FIG. 2, and the packing rings 27, 28 will be in sealing engagement with the lengths of pipe 9 and 10, as seen at 36 in FIG. 2.

Means are employed to exert pressure against the pistons 31 and 32. Such means conveniently take the form of a pressurized fluid, and it has been found particularly advantageous to introduce a hardenable material such as cement or an epoxy resin into the area 33. Upon setting, the hardenable material will thus occupy the enlarged area 33a without the necessity of further application of pressure in this area, and thus the connections at the inlet 34 may be removed. In this manner, convenient means are employed to lock the power operated means so that space 33a is not decreased.

Suitable sealing means such as o-rings 37, 38, 39 and 40 are employed to ensure a tight seal as the male and female pistons move relative to each other.

Check valve 41 is desirably included in the inlet conduit to admit fluid into the space 33 while preventing the fluid in that area from returning to the inlet conduit 35.

In FIG. 3 is illustrated an embodiment which is especially useful when only only one free length of pipe 53 is to be joined to a manifold or the like. In this embodiment, the cylinder 54 is fixed, and in this embodiment there is no need for separate casing 55 in the area of this cylinder, as it is desirably formed as an integral unit with the casing. At the end of the coupling adjacent pipe 53 are slips 56 resting in guide and slip bowl 57. Here again a resilient insert 58 is desirably included. Between the inlet conduit 59 and slips 56, as in the FIG. 1 embodiment, are junk ring 60, packing rings 61, and annular piston 62. At the end opposite pipe 53 there are no slips, packing rings, guide, etc., as such are unnecessary. As will be readily understood, this embodiment operates in the same manner as the FIG. 1 embodiment, except that upon pressurizing through inlet 59 only piston 62 and its associated rings and slips are movable, while cylinder 54 is fixed.

Figure 4:
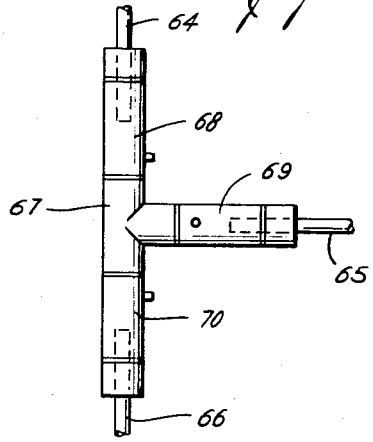
FIG. 4 is a perspective view of a means for connecting conduits in accordance with another embodiment of this invention.
Figure 5:
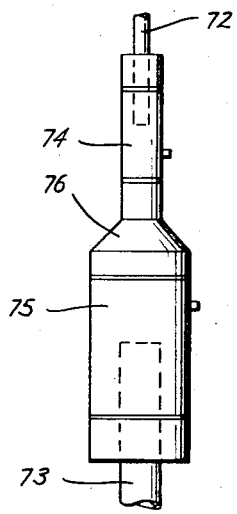
FIG. 5 is perspective view of a means for connecting conduits in accordance with yet another embodiment of this invention.

The FIG. 3 embodiment is especially useful in the embodiments illustrated in FIGS. 4 and 5. In the FIG. 4 embodiment, three lengths of pipe 64, 65, and 66 are joined at a tee 67. In this instance, three separate couplings, (for instance those of the FIG. 3 type) 68, 69 and 70, are securely fastened to tee 67 and are used to securely lock the pipe sections thereto.

In the FIG. 5 embodiment, a length of pipe 72 is joined to a length of pipe 73 of large diameter by means of two couplings 74 and 75 constructed in accordance with this invention which are joined together by a coupling piece 76. If the couplings 74 and 75 are constructed in accordance with the FIGS. 1-2 embodiment, rather than the FIG. 3 embodiment, and the lengths of pipe 72 and 73 are inserted in the coupling in a manner such that each pipe length is gripped by both sets of gripping means, an embodiment is provided which is especially desirable in those instances where one or more of the pipe lengths 72, 73 may be in compression rather than tension.

As will be readily recognized, any number of different lengths of pipe, or any different sizes of pipe, or any type of connection can be readily employed in the manner generally illustrated by the FIGS. 4 and 5 embodiments. For one example, a number of lines from separate offshore wells may be joined at a common manifold.

As one example of the operation of a coupling constructed in accordance with the embodiment of FIGS. 1 and 2, it may be desired to join together two lengths of pipe 2 and 3 which are underwater. Coupling 1 will be lowered to a diver, who guides pipe 9 into the coupling by means of the guide surface 16 of member 11 and similarly pipe 10 into the coupling by means of guide member 12. After the pipes 9 and 10 are in approximately the position shown in FIG. 1 (stops or any other convenient means may be employed to signify to the operator when this position has been reached) all air and/or water may be bled out of the area 33 by means of a release line (not shown) to at least partially evacuate the area 33. Then a pressurizing fluid such as a hardenable cement is brought into the area 33. This causes longitudinal movement of the pistons 31 and 32, which forces, through packing rings 27, 28 and junk rings 25, 26 the slip segments 17, 18 against the cam surfaces 15 of guide members 11, 12. The slips are moved radially inwardly in response to this axial movement until they firmly grip the outer surfaces of pipes 9, 10. After the slips are thus set, further movement of the pistons causes axial compression of the packing rings 27, 28 which expands these rings radially into sealing engagement with the outer surface of the pipes 9 and 10. The inlet connection is then removed and the pipes 9 and 10 are seen to be securely joined, with the flow therebetween progressing, of course, through the area 8 which is in fluid communication with the interior of each of pipes 9 and 10 and in fluid isolation with all areas outside coupling 1.

If the tool is to be used to repair a faulty section of pipe, it is usually preferred that the pipe length be cut in the area of the faulty section. Then the coupling is guided over the severed portion and set as described above. It is possible that in some instances it will be desired to slide the coupling for a long distance over a length of pipe rather than to cut the pipe in the damaged area.

In FIG. 7 is illustrated a particularly advantageous means for pressurizing a coupling 78 which is located adjacent the floor 79 of the ocean or other body of water 80. As illustrated, such means conveniently take the form of a tubular member 81 which contains the material to be used for pressurizing the coupling, as for example a hardenable epoxy resin 82. The tube 81 is adapted to be readily connected through a flexible conduit 83 to a pump 84 in fluid communication with a source of fluid under pressure at the surface of the water, for example on a boat 85, and is further adapted to be readily connected through a conduit 86 to the coupling 78. The tube 81 is comprised of a generally cylindrical hollow casing or housing 88 having caps 89 and 90 at the extremeties thereof, and a piston 91 axially movable therein, said piston being conveniently held in sealing engagement with the casing 88 as by means of seal 92. There is provided means such as nozzle 93 at the end of the tube 81 adjacent cap 90 for exit of the material 82 into the conduit 86.

As will be readily understood, in a preferred embodiment of the operation of this pressurizing device, a diver may take with him to the location of the coupling the tube 81, and at that point connect the tube to the flexible conduit 83 and the conduit 86. The pressurized fluid from the source at the surface is then pumped into the member 81, moving the piston downwardly in the tube and forcing the hardenable material through nozzle 93 into the conduit 86 and thence into the coupling 78. Actually, conduit 86, which may be flexible, may not be necessary as the nozzle 93 may be connectable directly onto the coupling 78.

The hardenable material thus fills space 33 and forces pistons 31, 32 apart. As will be understood to those skilled in the art, the hardenable material such as an epoxy may include a catalyst or setting agent to cause it to set or become hardened at a certain time.

In FIG. 6 is illustrated another particularly advantageous application of this invention. Here the coupling 95 is illustrated in its use as a well-head adapter. As will be readily understood from the above description, a coupling 95 constructed, for example, in a manner illustrated in the embodiment of FIG. 3, comprising housing 96, inlet 97 in communication with an annular space (not shown), pistons (not shown), engaging means (not shown), slips 98 and insert 99, is inserted onto the tubular casing 100 of a well, and is joined as by weld 101 to a casinghead 102. A blowout preventor or well assembly having a bottom flange 103 is securely joined as by bolts 104 to the casinghead, with seal rings 105 being inserted to prevent unwanted fluid communication between the interior of the casing and the area exterior casinghead 102.

It is seen from the above description that methods are provided for joining together two lengths of pipe, requiring no special preparation of the ends of the pipe to be joined. The methods of the invention are especially useful in joining lengths which are located in difficult working environments. For example, the invention is especially suitable for work underwater, as in connection with offshore wells. As another example, the invention is particularly useful in hazardous environments such as refineries where there is constant danger of explosion, and conventional method which employ welding are ruled out because of this danger.

Still further, the invention is especially advantageous for use in connection with shipboard piping systems.

The invention is also particularly useful in repairing a leak in a pipe length, by cutting the pipe at or near the leak and thence joining the pipe length to a coupling.

While the invention has been described in terms of particularly useful embodiments, it will be apparent to those skilled in the art that various changes might be made without departing from the scope of this invention. It will be understood that the term "pipe" as used in the appended claims would include a structure such as the casing illustrated in FIG. 6.

I claim:

1. A method suitable for connecting two pipe sections in difficult working environments, comprising:
   providing an elongate sleeve having a diameter suitable for fitting around said pipe sections, said sleeve having a first opening at one end thereof for receipt of one of said pipe sections, a second opening at the opposite end thereof for receipt of the other of said pipe sections, and a third opening in a side wall of said sleeve and communicating with a single annular chamber in said housing;
   supporting in said sleeve means axially spaced from said annular chamber to separately grip each of said pipe sections and means to separately sealingly engage each of said pipe sections, said gripping and sealing means being simultaneously responsive to fluid pressure applied through said single annular chamber for actuation thereof;
   subsequently guiding said pipe lengths respectively into said first and second openings in said sleeve;
   providing a source of fluid under pressure, and conduit means for transporting said fluid from said source to said third opening in said sleeve;
   attaching said conduit means to said third opening and to said fluid source, to establish fluid communication therebetween;
   introducing fluid from said fluid source through said conduit means into said third opening and thence into said annular chamber, said fluid serving to exert force in a direction axially away from said annular chamber, to
      move each of said gripping means simultaneously into gripping engagement with its respective pipe section, and
      move said engaging means simultaneously into sealing engagement with said pipe sections, thereby sealing each of said sections to said sleeve;
   terminating fluid communication between said fluid source and said sleeve; and,
   securely retaining said fluid in said sleeve, to thereby form a firm connection between said sections of pipe, and whereby fluid communication under high pressure may be established through said pipe sections and said sleeve.

2. The method in accordance with claim 1, wherein said fluid introduced into said sleeve is a hardenable material which, upon setting, hardens to form a permanent connection between said pipe sections and said sleeve.

* * * * *